United States Patent [19]

Breger et al.

[11] 4,103,992

[45] Aug. 1, 1978

[54] CORNEAL CONTACT LENS AND METHOD OF MAKING THE SAME

[75] Inventors: Joseph L. Breger, Highland Park, Ill.; Joseph A. Stemmle, Thousand Oaks, Calif.

[73] Assignee: Breger-Mueller Welt Corp., Chicago, Ill.

[21] Appl. No.: 542,576

[22] Filed: Jan. 20, 1975

[51] Int. Cl.² ............................................. G02C 7/04
[52] U.S. Cl. ................................... 351/160; 351/177
[58] Field of Search ............................ 351/160–162, 351/177

[56] References Cited

U.S. PATENT DOCUMENTS

| | | | |
|---|---|---|---|
| 2,544,246 | 3/1951 | Butterfield | 351/160 |
| 2,809,556 | 10/1957 | Hornstein | 351/160 |
| 3,087,284 | 4/1963 | Kratt | 351/160 X |
| 3,781,096 | 12/1973 | Townsley | 351/160 X |
| 3,951,528 | 4/1976 | Leeds | 351/177 |

OTHER PUBLICATIONS

"Minisculent Contact Lens" Advertisement in *Optical Journal & Review*, Mar. 15, 1961, pp. 30 & 31.

"Bayshore Technique" Article in *The Optician*, Oct. 25, 1963, pp. 395 & 396.

Gordon, Article in *Optometric Weekly*, Jan. 30, 1964, pp. 21–25.

Baron, Article in *Manufacturing Optics International*, Nov. 1971, pp. 198–202.

*Primary Examiner*—Conrad J. Clark
*Attorney, Agent, or Firm*—Fitch, Even, Tabin & Luedeka

[57] ABSTRACT

An improved transparent corneal contact lens and method of making the same is disclosed. The lens has an outer edge portion of about 0.7 mm effective radius and a thickness of between about 0.003 to about 0.004 inches. The apex of the outer edge is positioned to be at or below the center line between the posterior and anterior surfaces of the outer edge portion to enable lacrimal fluid to flow between the lens and the corneal surface as well as substantially reduce the possibility of collision by the upper lid during closing. The method involves slowly heating, maintaining and cooling the lens and thereafter cutting the lens within a specified time after it has reached ambient temperature, which enables the lens to be more thinly cut.

4 Claims, 6 Drawing Figures

U.S. Patent  Aug. 1, 1978  4,103,992
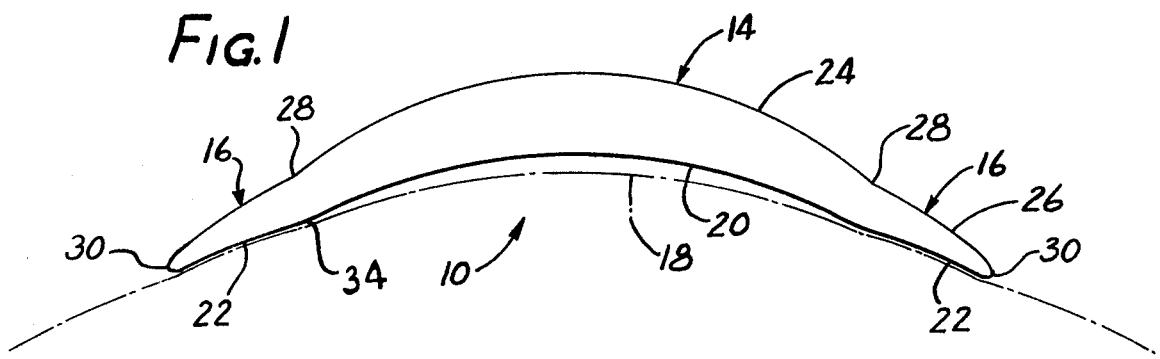
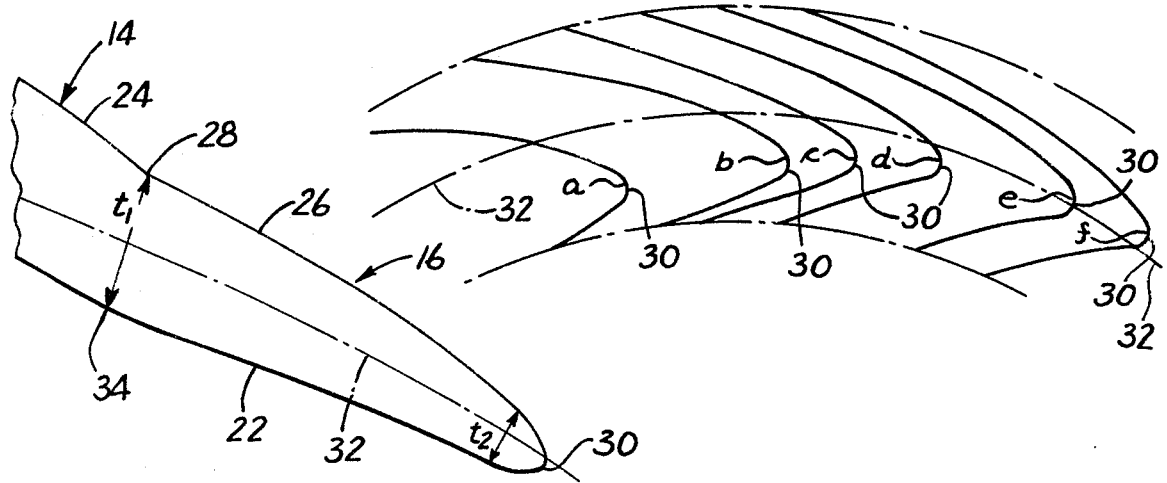
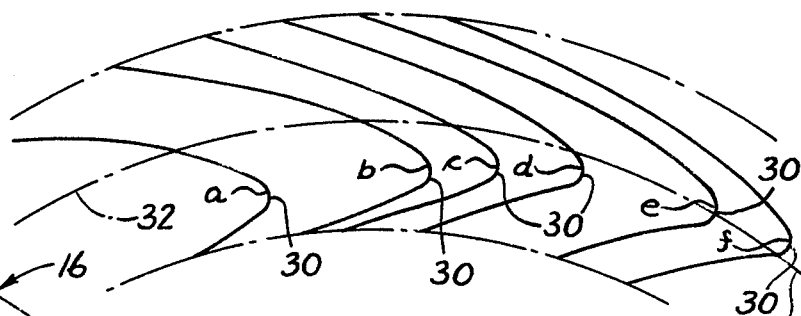
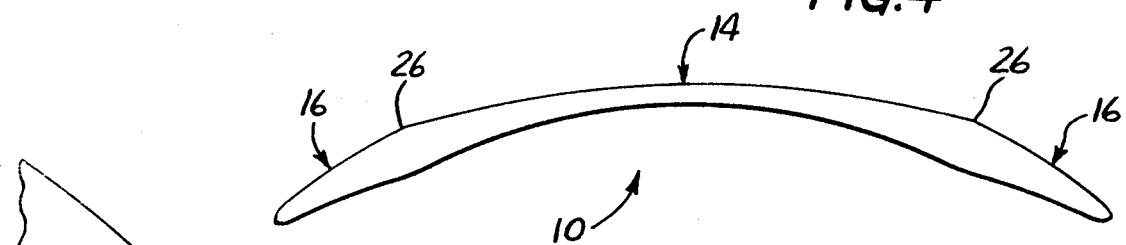
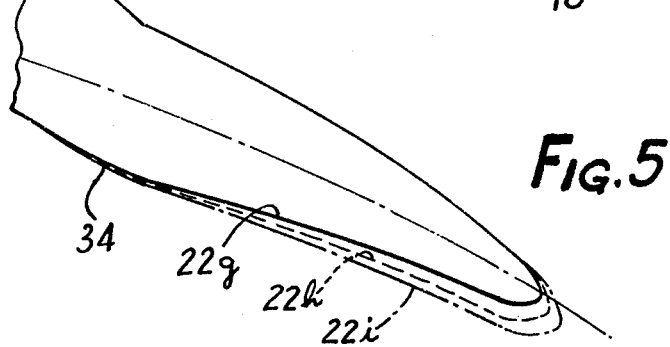
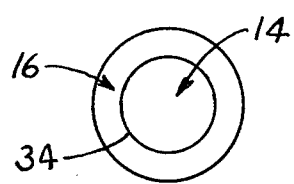

CORNEAL CONTACT LENS AND METHOD OF MAKING THE SAME

The present invention relates generally to optical lenses, and more particularly, to hard corneal contact lenses and to a method for making the same.

The increased popularity that contact lenses have recently experienced has resulted in continued research and development directed toward improving their design so that the lens can be worn by people who have heretofore been unable to wear them and to increase the comfort and wearing time for those who presently wear them.

While it is generally believed that the degree of comfort experienced by the wearer is primarily a function of the ability and experience of the individual prescribing or fitting the hard contact lenses to the eyes of the wearer, rather than any inherent structural or design improvements, the realization that more is involved than the art of fitting the lenses is being increasingly accepted.

The development of the soft lenses that are now being marketed has brought this to light. While such soft lenses may provide greater comfort to many wearers, they presently have many overriding disadvantages, such as increased maintenance and daily care and greater susceptibility to damage and scratching than their so-called hard lens counterparts.

The fitting of hard contact lenses continues to be an art, in part because the curvature of the cornea often changes after the lens has been inserted, even if the cornea was initially accurately measured and the lens accurately fitted. However, design considerations in the physical structure of the lenses can significantly affect the degree of comfort and wearability of such hard lenses, and it is to such design improvements that the present invention is directed.

Accordingly, it is a primary object of the present invention to provide an improved hard corneal contact lens, measured in terms of comfort, wearability and the like, and to a method for making the same.

Other objects and advantages will become apparent upon reading the following detailed description, in conjunction with the attached drawings, in which:

FIG. 1 is a side elevation of a cross section of a corneal contact lens embodying the present invention;

FIG. 2 is a side elevation of a portion of the lens shown in FIG. 1;

FIG. 3 is a composite side elevation particularly illustrating one feature of the present invention;

FIG. 4 is another side elevation of a cross section of a contact lens also embodying the present invention;

FIG. 5 is a side elevation similar to FIG. 2, but illustrating a composite of yet another feature embodying the present invention; and, FIG. 6 is a top view of the lens shown in FIG. 1.

The fitting of contact lenses still involves a substantial degree of subjectiveness on the part of many persons that are fitted. The degree of discomfort experienced by the wearer varies significantly from person to person even if the lenses are "properly" fitted. Much of the discomfort experienced by contact lens wearers results from the eyelid striking the edge of the lens during blinking. Many lenses are fitted so that the outer edge is spaced away from the cornea, enabling lacrimal fluid to flow between the lens and cornea which is necessary to avoid anoxia, edema and corneal stippling. The relative inflexibility of conventional lens has necessitated such a spaced outer edge so that lacrimal fluid could circulate under the contact lens. While greater circulation is achieved when the edge spacing is increased, greater discomfort and pain is also generally experienced because of the protruding edge of the lens that is struck by the eyelid during blinking. Although adjustment of these incompatible effects can be done to achieve the best overall comfort that is consistent with proper circulation, it is difficult to achieve a workable balance that will permit very little pain with long wearability.

The hard corneal lens of the present invention is believed to provide greater comfort than comparable designs of other hard contact lenses because of unique features that have been incorporated into its design, and which will be hereinafter described in detail.

Broadly stated, the contact lens of the present invention involves a number of novel features which interact to provide improved comfort and wearability. The lens has a smaller outside diameter, reduced thickness and increased flexibility than lens heretofore made using conventional materials such as polymethyl methacrylate. Moreover, the lens incorporates an edge design that minimizes painful eyelid collisions with the lens while enabling tear circulation beneath the lens. Moreover, the size and fitting of the lens restricts movement of the optical zone relative to the pupil of the eye.

The present invention also employs a unique heat treating method which enables the thinner cutting of polymethyl methacrylate lenses and also imports increased flexibility which has beneficial results in terms of tear circulation as will be hereinafter described.

Turning now to the drawings, and particularly FIG. 1, there is shown a side elevation of a cross section taken generally through the center of a contact lens 10 embodying the present invention which is of a concavo-convex form and is sized to fit generally within the palpebral fissure of a wearer's eye. Accordingly, the overall diameter of the lens is preferably within the range of about 7.0 to 8.5 millimeters in diameter, with an optical zone occupying at least all of the central portion 14 thereof, the lens also having an outer edge portion 16 or rim which preferably has a radius of about 0.5–0.8 millimeter.

The lens 10 is adapted to be fitted to the cornea of an eye which is shown in phantom by the line 18. It is preferred that the posterior side 20 of the central portion 14 of the lens have a curvature that is steeper than the curvature of the cornea, i.e., it has a radius of curvature less than the radius of curvature of the cornea to provide a space or reservoir where lacrimal fluid may accumulate. The posterior surface 22 of the outer edge portion 16 is generally different from the curvature of the posterior surface 20 of the central portion and is preferably parallel to the corneal surface. The anterior surface 24 of the central portion of the lens is machined to the prescription required for correcting the vision of the wearer and the curvature of this surface extends to the outer edge portion 16 where it intersects the anterior surface 26 of the outer edge portion at a point indicated at 28, although the optical zone may extend outwardly slightly beyond the point 28.

The preferred material for making the contact lens of the present invention is polymethyl methacrylate, although other suitable and acceptable materials may be used if desired.

With respect to the curvature of the posterior surface 20 of the central portion of the lens, it is preferred during fitting to measure K (defined as the flattest meridian of the cornea) using well known keratometer techniques and machine the surface 20 to produce at least about a ½ to ¾ diopter steeper curve than the K measurement. In cases of increasing corneal astigmatism, it may be desirable to further increase the curvature, i.e., up to about six diopters steeper than K, in extreme cases.

In keeping with an important aspect of the present invention and referring to the enlarged cross section of the outer edge portion 16 of the lens 10 shown in FIG. 2, the outer edge portion preferably has a width dimension of about 0.5–0.8 millimeter as measured laterally from the point 28 to the extreme end or apex 30. The thickness $t_1$ of the lens, which is the thickness of the lens at the intersection of the outer edge portion 16 and the central portion 14 has been found to provide the greatest comfort, particularly during blinking, if it is within the range of about 0.003 to about 0.004 inches. Increased discomfort is generally experienced if the dimension $t_1$ is greater than the 0.004 inches. Moreover, the thickness is preferably reduced in the laterally outward direction by means of gradual curves on both the posterior surface 22 and the anterior surface 26 of the outer edge portion until the outer end thickness, shown as the thickness $t_2$ is reached, whereupon the anterior and posterior surfaces are increasingly curved toward one another to define the apex 30. In this connection, it has been found that the increased comfort is produced if the thickness $t_2$ is within the range of 0.0015 to about 0.0025 inches.

Thus, the anterior surface 26 is preferably given an anterior bevel to provide a gradual taper to provide the reduced thickness $t_2$ compared to the thickness $t_1$ at the intersection point 28 of the outer edge portion and the central portion. However, the posterior surface 22 is preferably machined to be parallel to the cornea, since it is the contact between this surface and the cornea which supports the lens, because the posterior surface 20 of the central portion is spaced from the corneal surface as previously mentioned.

Once the posterior surface 22 of the outer edge portion is determined, then the anterior surface 26 of the outer portion can be given the proper bevel to produce the thickness $t_2$ within the predetermined range. It has been found that the thickness $t_1$ and $t_2$ can be machined or ground into contact lenses having the general configuration shown in FIG. 1 which produces a high plus or lenticular correction, as well as a high minus or myopia correction as shown by the lens illustrated in FIG. 4. It should be understood from comparing the myopia correction lens of FIG. 4 with the lenticular correction lens of FIG. 1 that the outer edge portion is generally similar notwithstanding the different type of visual correction that is machined in the respective lenses. In this connection, the thickness $t_1$ of the lens shown in FIG. 4 may possibly be greater than the thickness of the central portion 14 in some instances.

Turning now to FIGS. 1–3, and in accordance with another aspect of the present invention, it is well known that pain or discomfort experienced by a wearer is not primarily produced by the nerve endings in the cornea, but by very sensitive nerves located on the inside of the eyelid, assuming that the lens does not impinge upon the limbal area of the eye. Since a corneal contact lens is a foreign object positioned on the cornea, any excessive or abrupt change occurring during movement of the eyelid will be felt by the wearer. Accordingly, it is important that the upper lid ride over the contact lens during blinking as gradually as possible so that the foreign body feeling is minimized. The thicknesses $t_1$ and $t_2$ of the outer edge portion are believed to be important in minimizing the displacement of the eyelid during blinking. However, in addition to the above described outer edge portion thicknesses, the configuration of the outer edge itself is also believed to be important, in terms of initial comfort or discomfort and wearing fatigue.

Lens designs heretofore used have not been particularly concerned with the shape of the end or the location of the apex, other than to provide a smoothly rounded surface. Since contact by the leading edge of the upper eyelid against the end of the lens can cause considerable discomfort if there is an abrupt change felt by the eyelid while moving from the lacrimal fluid layer of the cornea onto the lens itself, the location of the apex of the lens relative to the lacrimal layer is important in providing a smooth transition as the eyelid travels over the lens. Since the curvature of the cornea varies from wearer to wearer, in terms of flatness or steepness, the mere presence of a smooth rounded edge may be insufficient to minimize or substantially preclude collision of the eyelid with the lens edge during blinking.

As best shown in FIGS. 2 and 3, the apex 30 is preferably positioned at or below a center line 32 located midway between the posterior and anterior surfaces 22, 26 of the outer edge portion 16 and has been found to substantially reduce pain producing collision by the upper eyelid. Thus, the apex 30 should be no higher than the center line and preferably be positioned between the center line and the corneal surface, although it is preferred that it is spaced a very small distance away from the cornea to enable lacrimal fluid to flow between the lens and the cornea. To particularly illustrate the location of the apex with respect to the center line 32, reference is made to FIG. 3 which illustrates a series of configurations $a$ through $f$ showing the location of the apex at a low elevation relative to the cornea in configuration $a$, gradually increasing to the exact center line in configuration $e$ and to a level higher than the center line in the configuration $f$. It should be understood that the shape of the posterior surface 22 should be initially made so that it is parallel to the cornea. Once the surface 22 is machined for parallelism relative to the cornea as shown by the surfaces $22g$, $22h$ and $22i$ in FIG. 5, for example, the bevel of the anterior surface 26 as well as the configuration of the edge, including the location of the apex 30, can then be determined. The surface 22 is generally referred to as the peripheral curve and meets the base curve at 34 which is shown in FIG. 6.

In accordance with another aspect of the present invention, it has been found that lenses of reduced thickness can be machined using conventional cutting lathes, with the reduced thickness being at least about 10% to about 35% thinner using the method of the present invention. Contemporary lenses made of polymethyl methacrylate are generally in the range of about 12 to about 14 thousandths of an inch thick in the central area of minimum thickness for a minus prescription lens. However, using the method of the present invention, the center portion thickness can be reliably made to be within the range of about 5 to about 10 thousandths of an inch. Thus, lenses can be made substantially thinner than has heretofore been done, it being understood that previous attempts to produce lenses having center thicknesses of 6 to 10 thousandths of an inch have resulted in high reject rates in addition to instability of the shape of the lenses. Stated in other words, prior attempts at machining lenses to the reduced thicknesses contemplated by the present invention resulted in lenses that would not reliably retain their shape and would therefore lose their optical stability.

To permit the thinner cutting of the contact lens made of polymethyl methacrylate, a heat treating method is used that is believed to be successful in changing some of the physical properties of the material. Prior to cutting a contact lens, a conventional small or short cylindrically shaped lens blank is first placed in an oven at ambient temperature and raised to a temperature within about 10° F of the softening point of the material, i.e., about 160° F over a period of about 3 to 4 hours preferably in the absence of moisture. The moisture can be removed by heating the blank in an oven with a material that absorbs water from the air or by vacuum if desired. After the blank has reached the 160° temperature, it is maintained at that temperature for a period of about 12 hours and thereafter allowed to slowly cool back to ambient temperature over a period comparable to the time required for raising the temperature. The blank is then removed from the oven and preferably within a period of about one-half to about one hour, placed on the cutting lathe and cut to the prescribed configuration. By using the heat treating procedure as described above, it has been found possible to cut the lenses thinner than had previously been possible and produce a more flexible lens that will retain its structural stability. Although it is not fully understood, it is believed that the treatment alters the physical characteristics, perhaps by altering the length of the polymeric chain.

In keeping with the present invention, it is believed that the thinner lens that has been heat treated in accordance with the above described method provides a pumping action during blinking that effectively circulates lacrimal fluid between the lens and the cornea and thereby generally prevents edema and anoxia, particularly when the base curve of the lens is at least ½ to ¾ diopters steeper than the K characteristic of the cornea. The high saggita (the space between the cornea and the surface 20 in the center of the lens) creates a reservoir of lacrimal fluid that also contributes to the optical correction of the lens.

In accordance with yet another aspect of the present invention, the surface area of the peripheral curve or rim area 16 is preferably about 30% of the total area including the rim area 16 and optical zone 14. This proportion results from the rim area having an incremental radial width of about 0.7 millimeters when the overall diameter is about 8.2 millimeters, for example. The larger rim area produces greater adherence of the lens to the cornea and provides greater resistance to the forces produced by the eyelid during blinking which tend to shift the lens relative to the cornea. The substantially reduced movement is advantageous in that off-center abberations, flare and glare as well as other problems are substantially reduced.

The above descrived improved corneal contact lens as well as the method of making the same, has resulted in significantly increased wearability and comfort to wearers and is believed to be a result of the improved design of the outer edge portion, in terms of the important thicknesses and the positioning of the apex of the outer edge relative to the center line. The proportion of the peripheral edge relative to the total surface area of the lens substantially reduces undesirable vertical and horizontal movement. These features, coupled with the reduced overall thickness of the lens itself, provides a hard corneal contact lens that represents a significant advance in the art.

Although various embodiments of the invention have been illustrated and described, variations, modifications and alternative constructions may be suggested to those skilled in the art. Accordingly, the scope of the protection to be afforded this invention should not be limited by the particular embodiments shown and described, and should be determined in terms of the definitions of the invention set forth in the appended claims, and equivalents thereof.

Various features of the invention are set forth in the following claims.

What is claimed is:

1. A structurally stable transparent corneal contact lens of generally concavo-convex form in cross section and having an outer diameter of about 7.0 to about 8.2 millimeters and sized to be fitted substantially within the limbus of the eye, the posterior side of the central portion of the lens having a curvature at least about one-half to six diopters steeper than the curvature of the cornea and the posterior side of the outer edge portion of the lens having a curvature such that it is substantially parallel to the curvature of the cornea, the outer edge portion of the lens being defined by the portion extending from the apex of the edge to a position located radially inwardly a distance of about 0.5 to about 0.7 millimeter, the thickness of the outer edge at said inward position being within the range of about 0.003 and 0.004 inch, the apex of said outer edge portion being between the center line of the outer edge portion and the posterior surface of the outer edge portion to enable flow of lacrimal fluid therebetween and to substantially reduce collision of the upper eyelid with the apex during closing of the eyelid, the center line of the outer edge portion being defined by a line running midway between the posterior and anterior surfaces thereof, the anterior surface of the outer edge portion having a gradual bevel extending to a point immediately adjacent the apex beyond which the anterior and posterior surfaces become increasingly curved toward one another to define the apex, the thickness of the outer edge portion at the point where the anterior and posterior surfaces begin to form the apex being within the range of about 0.0015 and 0.0025 inch and the surface area of the outer edge portion being at least about 30% of the combined surface areas of said central portion and said outer edge portion.

2. A contact lens as defined in claim 1, wherein said lens is comprised of polymethyl methacrylate.

3. A contact lens as defined in claim 2 wherein said lens is produced from a polymethyl methacrylate blank which has been heat-treated by raising its temperature to about 160° F. over a period of about three to four hours and then holding the temperature of said blank at about 160° F. for about ten to twelve hours, cooling the blank to room temperature over a period of about three to four hours and said lens being cut from the blank after it has reached room temperature.

4. A contact lens as defined in claim 3, wherein the central portion of said lens has a thickness within the range of about 5 and about 10 thousandths of an inch.

* * * * *